United States Patent Office 2,952,517
Patented Sept. 13, 1960

2,952,517
MANUFACTURE OF METAL CARBONYLS
Harold E. Podall and Hymin Shapiro, Baton Rouge, La., assignors to Ethyl Corporation, New York, N.Y., a corporation of Delaware
No Drawing. Filed Apr. 25, 1960, Ser. No. 24,255
3 Claims. (Cl. 23—203)

This invention relates to metal carbonyls particularly the manufacture of the transition metal carbonyls.

Some procedures for the preparation of certain metal carbonyls have been described in the literature. With particular metals, successful results are obtained by reacting the metal with carbon monoxide at high temperautres and pressures or in certain instances reacting particular metal salts with hydrogen and then carbon monoxide. These procedures are applicable only in limited instances as, for example, with the metals nickel and iron. They likewise leave much to be desired since stringent process techniques are required and the metal or metal compound must be in particular form.

The procedures likewise are not available to the more difficultly produced metal carbonyls. The most satisfactory procedure devised as yet for the preparation of certain more difficultly produced metal carbonyls involves the reaction of their salts with a Grignard reagent and then reacting the product so-produced with carbon monoxide. This two-step procedure has been improved by judicious choice of the Grignard reagent employed. However, even with these improvements the process suffers particular disadvantages which are to be overcome. For example, for some unexplained reason the process is relatively independent of variables such as pressure beyond a certain point. In other words, essentially no change is obtained in the rate of reaction or the yield when these variables are changed. Another inherent disadvantage in the process is that the yields are such that commercial employment of the procedure is not practical. A still further disadvantage of this process is that, during the course of reaction, by-product metal, that is the metal desired to form the metal carbonyl compound, is obtained and this material cannot be converted to the desired carbonyl compound.

Accordingly, it is an object of this invention to provide a new and novel process for the preparation of transition metal carbonyls. A particular object is to provide a procedure whereby these materials, especially such compounds difficultly obtainable by the prior art techniques, are obtained in higher yield than heretofore available. A specific object is to provide the carbonyls of the VI–B elements of the periodic chart of the elements in higher yield than heretofore obtainable.

The above and other objects of this invention are achieved by reacting a salt of a transition metal of the B-series of group VI of the periodic chart of the elements, including their oxides or sulfides, with a stable organometallic compound of a group III–A element of the periodic chart of the elements and carbon monoxide. The periodic chart of elements referred to above and hereinafter corresponds to the chart given on pages 392 and 393 of the Handbook of Chemistry and Physics, 36th edition (1954–1955), Chemical Rubber Publishing Company. While the benefits of this invention are generally applicable to the salts of all transition metals, the process is particularly well suited to those of molybdenum and tungsten. Further particular advantage is achieved when the organometallic compound is a compound of aluminum. Thus, one embodiment comprises the reaction of a salt of a VI–B element with an organoaluminum compound, particularly alkylaluminum compounds, and carbon monoxide.

When employing the procedure of this invention, simultaneous reaction of the metal salt, the stable organometallic compound and the carbon monoxide is obtained thus providing an enhancement in yield, faster reaction rates and minimization of undesirable by-product metal. Among further benefits of the process of this invention, it is generally applicable to all the designated transition metal salts producing such metals in chemical combination with carbon monoxide in higher yields than heretofore obtainable and with faster reaction rates. Thus, compounds which previously have not been obtainable or were produced in low yields by the prior art techniques are now provided in high yields, suitable for commercialization. It will be noted that the stringent processing operations of the prior art techniques are not required and the difficulty of producing by-product metal is overcome. For example, in the prior technique employing Grignard reagents, at the completion of the reaction, it is necessary to quench with water to obtain the product. This operation is not required in the present process since the product is directly obtained from the reaction. Another particular advantage of the present process is that many varied compounds of the transition metals can be employed. In contrast, with certain metals and employing the Grignard technique, only certain valence states of the metal can be utilized. For example, in the case of the chromium, molybdenum, and tungsten carbonyl preparation only the trivalent, pentavalent, and hexavalent states respectively produced by far the best results. Other advantages of the process of this invention will be evident as the discussion proceeds.

The salts of the transition metals employable are many and varied. For the purposes herein, the oxides and sulfides of these metals are also intended in the terminology "salts" although such are not truly salts. The transition metals include the metals of group VI–B, of the periodic chart of the elements (Fisher Scientific Company). The salts of such metals include both inorganic and organic salts. Typical examples of the inorganic salts are the halides, phosphates, sulfites, sulfates, nitrates, fluosilicates, carbonates, oxides, sulfides, and the like salts of such metals. The organic salts of these metals include, for example, the carboxylates, e.g., alkyl, aryl, cycloalkyl, and the like carboxylates, the alcoholates, e.g., phenates, alkoxides, and enolates and the thioalcoholates or mercaptides. Among the inorganic salts employable in the process of this invention are chromium bromide, iodide, fluoride and chloride, chromium carbonate, the various chromium oxides, chromium phosphate, chromium fluosilicate, chromium sulfate, chromium sulfide, chromium sulfite, and the like, including similar such compounds wherein chromium is replaced by the metals, for example, mloybdenum and tungsten. Among the organic salts of the transition metals employable are included for example, chromium acetate, chromium benzoate, chromium citrate, chromium formate, chromium lactate, chromium oxalate, chromium malonate, chromium valerate, chromium naphthenate, chromium oleate, chromium acetylacetonate, chromium toluate, chromium phenate, chromium ethylate, chromium decanoate, chromium thiomethylate, and the like salts of the transition metals described previously. It is to be understood that all valence states of the metals are intended. For example, "chromium" is meant to denote both the chromic and chromous salts. In general, in the organic type salts, the organo portions will contain between 1 to 25 carbon atoms in each radical although higher such acid salts can be employed.

Such salts of the metals chromium, molybdenum and tungsten are preferred in the process because of their greater reactivity and economy. The process of this invention is especially well suited to the production of carbonyls of the metals molybdenum and tungsten which exhibit different problems and are more difficult to prepare. Therefore, these metals are especially preferred. Although the carbonyl compounds of tungsten and molybdenum have heretofore been obtained only in low yields, according to the present process, they are readily obtainable in high yield.

For best results the inorganic salts of the transition metals, particularly the halides, are especially preferred. In those instances wherein the metal salt is a solid in the reaction mixture, it is generally desirable to employ such materials in finely divided form of the order of about 1,000 microns or less.

The organometallic compound employed is one of an element of group III-A of the periodic table. Such elements include boron, aluminum, gallium, indium and thallium. The organometallic compound will usually contain between about 1 to 25 carbon atoms in each organic radical. In general, the metal is attached to at least one carbon atom of an organic radical. It can additionally, however, be attached to other elements, as for example, the halides, hydrogen or another metal, particularly the group I-A metals. Typical examples of such organometallic compounds include the following: trimethylboron, triethylboron, ethylboron difluoride, sodium tetraethylborate, trimethylaluminum, triethylaluminum, methyldiethylaluminum, tripropylaluminum, dimethylhexylaluminum, methylethyloctylaluminum, triisooctylaluminum, diethylaluminum hydride, methylaluminum dihydride, triisobutylaluminum, diisobutylaluminum hydride, octylaluminum dihydride, sodium aluminum tetraethyl, lithium aluminum tetraethyl, potassium aluminum triethyl hydride, sodium aluminum tetrabutyl, potassium aluminum dioctyl dihydride, dimethylaluminum chloride, ethyl aluminum dichloride, ethylaluminum sesquichloride, trimethylgallium, triethylgallium, methyldiethylgallium, tripropylgallium, trioctylgallium, triisobutylgallium, trimethylindium, triethylindium, tripropylindium, triisobutylindium, triphenylaluminum, sodium aluminum diethyl acetylide, cyclohexyl diethylaluminum, tribenzyl aluminum, triethyl thallium, triphenyl thallium, and the like.

For practical purposes and best results, the alkylaluminum compounds are preferably employed. These compounds are more stable, more readily available and are of higher reactivity. Generally, each alkyl group therein will contain from 1 up to and including about 8 carbon atoms.

In general, the process is readily performed by placing the transition metal salt, the organometallic compound and the carbon monoxide into a reaction vessel in a suitable inert atmosphere and, if desired, in the presence of an essentially inert liquid medium. The carbon monoxide is generally pressurized into the reactor. The reaction mixture is likewise usually agitated to provide adequate contact. In most instances the simultaneous reaction of these materials will take place at room temperature although heating is preferred to effect greater reaction rates. At the completion of the reaction, the product is recovered in a conventional manner such as distillation, sublimation, or separation of by-products leaving the product in the liquid medium, when employed, which can then be recovered by concentration and filtration.

The process of this invention will be more fully understood by reference to the following examples. In all examples, parts and yields are by weight.

*Example I*

To a reactor equipped with external heating means, internal agitation, means for maintaining pressure, and means for admitting and discharging reactants and products, is added 1.0 part of chromium trioxide and 9.1 parts of triethylaluminum in 30 parts of benzene under an inert atmosphere of nitrogen. The reactor is then pressurized with 2500 p.s.i.g. of carbon monoxide and heated with continuous agitation to 160° C. These conditions are maintained for a period of 3 hours. At the end of this period, after cooling to room temperature, the gases in the reactor are vented to the atmosphere and the mixture is quenched with water and dilute hydrochloric acid. The mixture is then extracted with diethyl ether, and the ether layer is then separated and dried. This dry layer is then subjected to distillation to concentrate the product. Chromium hexacarbonyl is obtained upon filtration.

Similar results are obtained when the above example is repeated while employing a carbon monoxide pressure of 500 p.s.i.g. with a reaction period of 10 hours.

*Example II*

The procedure of Example I was repeated with the exception that 12 parts of chromic chloride were reacted with 51 parts of aluminum triethyl in 51 parts of diethyl ether at a temperature of 115° C. for 7 hours with the pressure of the carbon monoxide at 1000 p.s.i.g. Chromium hexacarbonyl was recovered as in Example I in 92 percent yield.

*Example III*

Employing the procedure of Example I, chromium hexacarbonyl is recovered in high purity and yield when 1.2 parts of chromium dichloride are reacted with 3.5 parts of diethylaluminum hydride in 30 parts of diethyl ether at 6000 p.s.i.g. pressure of carbon monoxide for 8 hours at 120° C.

*Example IV*

In this run, 2½ parts of chromous acetylacetonate are reacted with 4½ parts of aluminum triethyl in 25 parts of tetrahydrofuran at a pressure of 3000 p.s.i.g. of carbon monoxide at 100° C. Chromium hexacarbonyl is obtained in high yield.

*Example V*

To a reactor equipped with external heating means, internal agitation, means for maintaining pressure, and means for admitting and discharging reactants and products, are added 1.7 parts of molybdenum dichloride and 4.5 parts of triethylaluminum in 25 parts of tetrahydrofuran under an inert atmosphere of nitrogen. The reactor is then pressurized with 2500 p.s.i.g. of carbon monoxide and heated with continuous agitation to 120° C. These conditions are maintained for a period of 4 hours. At the end of this period, after cooling to room temperature the gases in the reactor are vented to the atmosphere and the mixture is quenched with water and dilute hydrochloric acid. The mixture is then extracted with diethyl ether, and the ether layer is then separated and dried. This dry layer is then subjected to distillation to concentrate the product. An essentially quantitative yield of molybdenum hexacarbonyl is obtained.

*Example VI*

Molybdenum hexacarbonyl is obtained in high yield when 7.0 parts of triethylaluminum are reacted with 2.0 parts of molybdenum trichloride in 30 parts of pyridine at 110° C. for 2 hours under a carbon monoxide pressure of 10,000 p.s.i.g.

*Example VII*

Employing the procedure of Example I chromic acetate, triphenylthallium and carbon monoxide at a pressure of 15,000 p.s.i.g. are reacted in the dimethyl ether of diethylene glycol at 165° C. for 10 hours to produce chromium hexacarbonyl.

*Example VIII*

Tungsten hexacarbonyl is obtained in high yield and purity when 4.0 parts of tungsten hexachloride are reacted with 2 parts of trimethylaluminum under a pressure of 7500 p.s.i.g. of carbon monoxide in the presence of 30 parts of toluene for 11 hours at 100° C.

Example IX

When 1.2 parts of chromic chloride were reacted with 4.5 parts of triethylaluminum in 25 parts of diethyl ether at a pressure of 3000 p.s.i.g. of carbon monoxide at 100° C. for 3 hours, chromium hexacarbonyl was formed in 30 percent yield.

Example X

When 2.3 parts of tungsten trioxide are reacted with 6.8 parts of triethylaluminum in diethyl ether at 100° C. for 3 hours under a carbon monoxide pressure of 4000 p.s.i.g, tungsten hexacarbonyl is obtained

Example XI

When 1.4 parts of molybdenum trioxide are substituted for the tungsten trioxide in the above example, molybdenum hexacarbonyl is obtained.

Example XII

When molybdenum pentachloride is reacted with triethyl boron and carbon monoxide according to the procedure of Example XI, molybdenum hexacarbonyl is obtained.

Example XIII

Employing the equipment of Example I to 79 parts of tungsten hexachloride in 100 parts of benzene under 1000 p.s.i. of carbon monoxide was added 89 parts of triethylaluminum in 200 parts of benzene at 50–94° in the course of about one hour. The mixture was then stirred an additional two hours at 50°. The reaction mixture was then quenched with water and dilute aqueous hydrochloric acid and then steam distilled to give a 92 percent yield of tungsten hexacarbonyl.

Similar results are obtained when other group VI–B transition metal salts are employed in the above examples. For example, chromium sulfide and the like can be substituted for the salts employed in the above examples. For the organometallic compounds employed in the above examples one can substitute dimethylaluminum hydride, tribenzylaluminum, tricyclohexylindium, ethylaluminum sesquichloride, diethylaluminum bromide, triethyl gallium, triphenyl gallium, boron or indium, trimethylindium, and the like.

The temperature at which the reaction is conducted is not critical and generally temperatures between 0 to about 200° C. are employed. In general, the higher the temperature the faster the reaction rate. Accordingly, for such purposes it is preferred to operate at temperatures ranging from 75 to 175° C., depending upon the reactants employed. Likewise, the pressure can be varied over a wide range from superatmospheric to subatmospheric pressures. Ordinarily, since the carbon monoxide is a gas, pressures above atmospheric are employed. A preferred range is between 500 to 4000 p.s.i. in order to obtain optimum results.

The time of reaction will likewise depend somewhat upon the other conditions under which the reaction is conducted although times between about 1 minute to 20 hours are generally quite adequate. In order to minimize side effects it is preferred to conduct the reaction for a period of from 5 minutes to 6 hours.

The proportions of the reactants can likewise be varied and generally are based upon the metal salt. In this connection between about 1 mole to 6 moles and higher of the organometallic compound are employed per mole of the metal salt. However, as the temperature is increased the number of moles of organometallic compound generally can be decreased. Where excesses of the organometallic compound are employed, such excesses may be recovered and reused. The carbon monoxide is generally employed in stoichiometric amounts, although excesses can be beneficially employed.

While the above examples indicate that an organic diluent is employed, it is to be understood that such are not essential. In general, when such are employed they should be essentially inert to the reactants. Furthermore, it is desirable but not necessary that they exhibit solubility for one or all of the reactants. Among such organic diluents which can be employed are included the hydrocarbons, ethers and amines. Among the hydrocarbons included are, for example, nonanes, octadecanes, hexanes, toluene, benzene, xylene, mesitylene and mixed hydrocarbons such as gasoline, diesel oil and the like petroleum fractions. Among the ethers employed are included for example the non-aromatics, aromatics and polyethers including, for example, di-sec-butyl ether, di-n-heptyl ether, di-isopropyl ether, ethylisoamyl ether, methylphenyl ether (anisole), p-tolyl ether, ethylphenyl ether, tetraethylene glycol dimethyl ether, and the dimethyl, diethyl, and di-n-butyl ethers of the diethylene glycol. Among the amines which are employable are included dimethyl amine, diethyl amine, dioctyl amine, diphenyl amine, dicyclohexyl amine, methylethyl amine, p-methyl pyridine, o-methyl pyridine, 2,6-dimethylpyridine, isoquinoline, trimethyl amine, triethyl amine, tributyl amine, tricyclohexyl amine and the like.

The coordinating solvents, especially the ethers, are particularly preferred since these materials exhibit a reaction promoting effect.

The process provides products which are of considerable use. These products can be, for example, subjected to high temperatures, thereby providing decomposition to obtain the respective metals in finely divided form. For example, when molybdenum carbonyl is heated at a temperature above 250° C. in an inert atmosphere a finely divided pyrophoric product is obtained which is useful in electronic tubes for anodes and support members or in alloying in making steels. Another particular use for the compounds produced according to the process of this invention is as additives to fuels for internal combustion engines and the like. For example, when sufficient chromium hexacarbonyl is added to commercial gasoline to obtain compositions containing 1 gram of chromium per gallon, the octane number of the gasoline is increased. The products are also useful as chemical intermediates in preparing organometallic compounds. These and other uses will be evident to those skilled in the art.

This application is a continuation-in-part of our copending application Serial No. 704,271, filed December 23, 1957, now abandoned.

Having thus described the process of this invention it is not intended that it be limited except as set forth in the following claims.

We claim:

1. The process of making a metal hexacarbonyl which comprises reacting a salt of a transition metal of the B-series of group VI of the periodic chart of the elements with a stable organometallic compound of a group III–A element and carbon monoxide at a temperature of from about 0° to 200° C. and a carbon monoxide pressure of from about atmospheric to about 15,000 p.s.i.g. said organometallic compound having its metal atom bonded directly to a carbon of the organo group.

2. The process of claim 1 wherein the organometallic compound is an alkyl aluminum.

3. The process of claim 1 wherein the organometallic compound is aluminum triethyl.

References Cited in the file of this patent

UNITED STATES PATENTS

| | | |
|---|---|---|
| 2,739,169 | Hagemeyer | Mar. 20, 1956 |

FOREIGN PATENTS

| | | |
|---|---|---|
| 678,712 | Great Britain | Sept. 10, 1952 |

OTHER REFERENCES

Sedgwick: "Chemical Elements and Their Compounds," 1950, vol. 1, p. 415.

Babor et al.: "General College Chemistry," 1940, p. 88.